United States Patent
Mcdougall et al.

(10) Patent No.: US 12,120,027 B2
(45) Date of Patent: Oct. 15, 2024

(54) UNDERLAY NETWORK TRAFFIC STEERING

(71) Applicant: Cisco Technology, Inc., San Jose, CA (US)

(72) Inventors: Bruce Mcdougall, Anacortes, WA (US); Jeff Byzek, Raleigh, NC (US); Alberto Rodriguez-Natal, Leon (ES); Saswat Praharaj, Pleasanton, CA (US); Fabio R. Maino, Palo Alto, CA (US); Steven William Wood, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 17/992,140

(22) Filed: Nov. 22, 2022

(65) Prior Publication Data

US 2024/0171512 A1    May 23, 2024

(51) Int. Cl.
*H04L 45/74* (2022.01)
*H04L 45/00* (2022.01)
*H04L 45/24* (2022.01)

(52) U.S. Cl.
CPC ............... *H04L 45/74* (2013.01); *H04L 45/24* (2013.01); *H04L 45/566* (2013.01)

(58) Field of Classification Search
CPC ........ H04L 45/74; H04L 45/24; H04L 45/566

(Continued)

(56) References Cited

U.S. PATENT DOCUMENTS 11,146,507 B1 * 10/2021 Filsfils ............... H04L 45/34
11,606,286 B2 * 3/2023 Michael ............... H04L 45/24

(Continued)

FOREIGN PATENT DOCUMENTS

| CN | 114205279 A | 3/2022 | |
| EP | 3736713 A1 * | 11/2020 | ........... G06F 21/335 |
| WO | WO-2009062956 A2 * | 5/2009 | ............... G01S 1/72 |

OTHER PUBLICATIONS

Micro SIDs: a solution for Efficient Representation of Segment IDs in SRv6 Networks Angelo Tulumello; Andrea Mayer; Marco Bonola; Paolo Lungaroni; Carmine Scarpitta; Stefano Salsano; Ahmed Abdelsala Date of Conference: Nov. 2-6, 2020 Publisher: IEEE (Year: 2020).*

(Continued)

*Primary Examiner* — Younes Naji
(74) *Attorney, Agent, or Firm* — Lee & Hayes, P.C.

(57) ABSTRACT

Techniques for steering overlay network traffic along specific paths through an underlay network. The techniques may include determining a path through an underlay network that is optimized for sending a packet from a first node of an overlay network to a second node of the overlay network. The techniques may also include determining a destination address for sending the packet along the path from the first node to the second node, the destination address including a micro segment identifier (uSID) corresponding with an underlay node that is disposed along the path through the underlay network and trailing bits representing a portion of an address that corresponds with the second node. The techniques may also include causing the packet to be modified to include the destination address such that the packet is sent from the first node to the second node along the path.

20 Claims, 4 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2012/0179796 A1* | 7/2012 | Nagaraj | H04L 41/50 709/223 |
| 2017/0064717 A1* | 3/2017 | Filsfils | H04L 45/50 |
| 2017/0149582 A1* | 5/2017 | Cohn | H04L 12/4633 |
| 2019/0394211 A1 | 12/2019 | Filsfils et al. | |
| 2020/0252234 A1 | 8/2020 | Ramamoorthi et al. | |
| 2021/0243107 A1 | 8/2021 | Retana et al. | |
| 2021/0320884 A1 | 10/2021 | Filsfils et al. | |
| 2021/0352011 A1* | 11/2021 | Boutros | G06F 13/4022 |
| 2022/0053072 A1 | 2/2022 | Filsfils et al. | |
| 2022/0116317 A1 | 4/2022 | Goud Gadela et al. | |
| 2022/0124019 A1* | 4/2022 | Boutros | H04L 45/033 |
| 2022/0286395 A1 | 9/2022 | Gandhi et al. | |

OTHER PUBLICATIONS

Micro SIDs: a solution for Efficient Representation of Segment IDs in SRv6 Networks Angelo Tulumello; Andrea Mayer; Marco Bonola; Paolo Lungaroni; Carmine Scarpitta; Stefano Salsano; Ahmed Abdelsalam; Pablo Camarillo; Darren Dukes; Francoid Clad; Clarence Filsfils 2020 (Year: 2020).*

Cheng W., et al., "The Smart SD-WAN Architecture", 2022 IEEE 22nd International Conference on Communication Technology (ICCT), IEEE, Nov. 11, 2022, pp. 667-671, XP034316590.

International Search Report and Written Opinion for International Application No. PCT/US2023/080475, mailed Feb. 16, 2024, 20 Pages.

* cited by examiner

UNDERLAY NETWORK TRAFFIC STEERING

TECHNICAL FIELD

The present disclosure relates generally to techniques for, among other things, granular steering of overlay network traffic through specific paths of an underlay network.

BACKGROUND

Overlay network architectures generally include a series of overlay tunnels that are established between forwarding elements of the overlay. The overlay systems are then able to steer or direct classes of traffic or flows over selected overlay tunnels based upon policy and performance parameters. However, once traffic is in an overlay tunnel, the traffic's path through the underlay network is typically out of the overlay network's control.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes various technologies for steering overlay network traffic through specific paths of an underlay network to meet policy and performance parameters. By way of example, and not limitation, the techniques described herein may include determining a path through an underlay network that is optimized for sending a packet from a first node of an overlay network to a second node of the overlay network. The techniques may also include determining a destination address for sending the packet along the path from the first node to the second node, the destination address including a micro segment identifier (uSID) corresponding with an underlay node that is disposed along the path through the underlay network and trailing bits representing a portion of an address that corresponds with the second node. The techniques may also include causing the packet to be modified to include the destination address such that the packet is sent from the first node to the second node along the path.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, overlay-based network architectures generally include a series of overlay tunnels that are established between forwarding elements of the overlay network. The overlay network systems are then able to steer or direct classes of traffic or flows over selected overlay tunnels based upon policy and performance parameters. For instance, under normal operation an overlay network control plane programs forwarding entries on overlay data plane nodes. These forwarding entries may include an overlay encapsulation instruction such as a generic routing encapsulation (GRE) or internet protocol security (IPsec) header. The overlay network data plane nodes may then steer incoming traffic via an overlay tunnel based upon routing, policy, and performance attributes as calculated by or input into the overlay network control plane. These overlay tunnels are established from an overlay data plane node to another overlay data plane node over an underlay that is typically outside the overlay network's control. That is, from the overlay's point of view, the overlay network data plane elements just need to have IP reachability between them. For underlay connectivity, the overlay data plane element might have configured the upstream service provider router or ingress provider edge as the default route, although they may optionally maintain a border gateway protocol or other routing protocol session with the ingress provider edge. However, once traffic is in an overlay tunnel, the traffic's path through the underlay network is typically out of the overlay's control.

This application is directed to technologies that enable overlay-based network systems (e.g., software-defined wide area network (SD-WAN) systems, overlay-based software-defined networks (SDN), etc.) the ability to steer their overlay traffic through specific path(s) of a service provider underlay network. For example, the technologies disclosed herein provide for overlay-based network systems to subscribe to service provider underlay network services and to receive packet encapsulation instructions such that the overlay traffic may be steered via specific paths through the service provider underlay network. Among other things, the technologies described herein leverage and combine the use of (i) segment routing over internet protocol version six (IPv6) data plane (SRv6) micro segment identifier (uSID) addressing and forwarding techniques; (ii) underlay network topology and telemetry/performance graphs made available via an SDN Traffic Engineering Application (e.g., a Generalized SDN Infrastructure Platform (GSIP), a Transport SDN Platform, or the like); (iii) an SRv6 uSID calculator service/component that is configured to mine GSIP topology/performance graphs and calculate 128-bit IPv6 destination addresses, which may be comprised of or include one or more SRv6 uSIDs that can trigger uSID shift-and-forward behavior in underlay network elements and thus execute the requested steering function or SLA as packets traverse the underlay network; and (iv) WAN (e.g., SD-WAN) data plane element's packet encapsulation capabilities and tunnel endpoint addresses.

In some examples, a controller of the service provider network (e.g., GSIP) may collect and maintain real-time and/or historical underlay network topology and performance data. In some instances, this may include mapping the overlay tunnel endpoint (TEP) prefix data to an overall topology graph. In some examples, the overlay network may subscribe to service provider underlay network services, and the overlay control plane may register/authenticate with the controller of the service provider network and provide the controller with a list of overlay tunnel endpoints. In some examples, an SRv6 uSID calculator component, which may be associated with the service provider network controller, may receive the overlay tunnel endpoint information and populate it in a database that is accessible to the service provider network controller such that the overlay data plane nodes (e.g., tunnel endpoint nodes) become part of the overall topology/performance graph.

In some examples, for certain traffic classes or flows that require certain service on the underlay, when the overlay network programs the data plane nodes to steer their traffic through an overlay tunnel, the overlay control plane may make an underlay network service request via an application programming interface exposed by the controller of the underlay service provider network. In such examples, the SRv6 uSID calculator may field the service request and query the database, or an SRv6 topology/performance cache, for paths through the underlay that satisfy the service request. That is, the SRv6 uSID calculator, or the underlay network controller itself, may determine a path through the underlay that is optimized to satisfy the request in terms of policy, performance, routing, and/or the like. In the case that the database is queried, the database may respond with path information, including SRv6 locator segment identifiers (SIDs) for each of the underlay nodes in a given path.

In this way, the SRv6 uSID calculator may construct or otherwise determine a 128-bit IPv6 destination address, which is embedded with (i) one or more SRv6 uSIDs corresponding with the underlay node(s) and (ii) trailing bits, which when the micro-segment shift-and-forward operations are completed by the underlay nodes, the resulting 128-bit IPv6 address will be the same address as that of the overlay tunnel endpoint node's address. That is, the SRv6 uSID calculator, and/or the controller of the service provider underlay network, may have functionality to be able to combine SRv6 uSID steering bits and tunnel endpoint "trailing bits" into a common IPv6 destination address such that the overlay dataplane node (e.g., the overlay tunnel headend node) can impose or otherwise encapsulate a single, outer IPv6 header and thus prevent the need for packet recirculation. In other words, the techniques of this disclosure include techniques to enable the manipulation of the overlay tunnel endpoint addressing scheme such that an outer IPv6 destination address can be created which has embedded SRv6 uSID steering SIDs. By combining underlay steering bits and overlay termination bits in a single 128-bit destination address allows for the functionality to be able to "steer the underlay" without incurring the overhead of a multiple segment list segment routing header (SRH).

As an example of this 128-bit IPv6 address determination, upon receiving the underlay network service request, the SRv6 uSID calculator may perform database queries for one or multiple path(s) that will satisfy the service request. An example response could include the following four 128-bit SRv6 segment identifiers, in addition to other path attribute data:

FC00:0000:0001:0000:0000:0000:0000.
FC00:0000:0003:0000:0000:0000:0000.
FC00:0000:0004:0000:0000:0000:0000.
FC00:0000:0006:0000:0000:0000:0000.

However, it would be inefficient and burdensome to have the overlay data plane element (overlay tunnel headend node) impose a full SRv6 SRH with so many 128-bit SIDs on outbound packets. Instead, the SRv6 uSID calculator may derive a single 128-bit IPv6 destination address by plucking out the necessary micro-segment (uSID) bits from each 128-bit segment identifier. As such, and continuing the above example, the SRv6 uSID calculator may analyze the provided SRv6 SID list as follows:

FC00:0000 is the SRv6 uSID block.
FC00:0000:0001 is the upstream service provider underlay router, which the overlay data plane element is aware of, therefore this micro-segment may not be needed.
FC00:0000:0003 is the first underlay steering hop. The "0003" will be shifted out at underlay node 3.
FC00:0000:0004 is the second underlay steering hop. The "0004" will be shifted out at underlay node 4.
FC00:0000:0006 is the egress service provider underlay router; this micro-segment is not needed due to PHP behavior Then the SRv6 uSID calculator may determine what the final IPv6 destination address needs to be by matching the tunnel endpoint address previously populated in the graph. For instance, continuing the above example, the overlay tunnel endpoint address may be as follows:

FC00:0000:0009:0009::/64

The SRv6 uSID calculator may then derive the 128-bit IPv6 destination address with SRv6 micro-segment instructions inserted between the SRv6 uSID block and the overlay tunnel endpoint trailing bits, such as follows:

FC00:0000:0003:0004:0009:0009:0000:0000/64

In examples, the SRv6 uSID calculator may then pass the 128-bit IPv6 destination address to the overlay network control plane (e.g., SD-WAN controller) in response to the underlay network service request. The overlay control plane may then program the data plane node (e.g., overlay tunnel headend) with forwarding entries such that any traffic class or flow that requires the service provider underlay network service is encapsulated in this new IPv6 header whose destination address contains embedded SRv6 micro-segment instructions to cause the packet to be sent along a specific underlay path, and whose final 128-bits—after shift-and-forward operations in the underlay—will match the egress overlay tunnel endpoint address.

In this way, upon receipt of traffic matching the underlay services ruleset, the overlay node (e.g., overlay tunnel headend node) encapsulates the packets and sends them outbound to the service provider underlay. In examples, the service provider's SRv6 enabled underlay nodes shift-and-forward the traffic per the micro-segment instructions found in the outer IPv6 destination address. Additionally, after the final shift-and-forward, the packet arrives at the egress overlay data plane node, the outer IPv6 destination address matches its own tunnel endpoint address, and the node decapsulates the outer header and forwards the original packet towards its destination.

According to the technologies disclosed herein, several improvements in computer-related technology and networking can be realized. For example, the technologies disclosed herein for steering traffic through a specific path of an underlay service provider can improve end-user and/or application experience by offering more granular steering of overlay-based network traffic (e.g., SD-WAN traffic, SDN traffic, WAN traffic, etc.) through the service provider network. Additionally, the techniques disclosed herein increases the value of both the overlay network system and the service provider's underlay network, creating a win-win-win-win for the customer/end-user, the overlay owner, the service provider, and pull through of overlay and SRv6 technologies.

By way of example, and not limitation, a method according to the technologies disclosed herein may include receiving, from a controller associated with an overlay network, a request associated with sending a packet from a first node of the overlay network to a second node of the overlay network via an underlay network disposed between the first node and the second node. In some examples, the controller may be a software defined networking (SDN) controller and the overlay network may be a software-defined wide area network (SD-WAN). In some examples, the first node of the overlay network may be a headend node of an overlay tunnel and the second node may be a tunnel endpoint node of the overlay tunnel. The overlay tunnel may traverse the underlay network. In examples, this request may be received from the overlay network controller by a controller of the underlay network via an API that the underlay network controller exposes.

In examples, the method may also include determining a topology graph associated with the underlay network, the topology graph indicative of a topology of the underlay network and connections between one or more data plane nodes of the overlay network and one or more edge nodes of the underlay network. For instance, the controller of the underlay network (e.g., GSIP) may collect and maintain real-time and/or historical underlay network topology and performance data. In some instances, this may include mapping overlay tunnel endpoint prefix data to the overall underlay topology graph. In some examples, the overlay network controller may subscribe to the underlay network services, and the overlay control plane may register/authenticate with the controller of the underlay network and provide the controller with a list of overlay tunnel endpoints. In some examples, an SRv6 uSID calculator component, which may be associated with the underlay network controller, may receive the overlay tunnel endpoint information and populate it in a database that is accessible to the underlay network controller such that the overlay data plane nodes (e.g., tunnel endpoint nodes) become part of the overall topology/performance graph.

In some examples, the method may also include determining, based at least in part on a parameter (e.g., policy parameter, performance parameter, etc.) included in the request, a path through the underlay network that is optimized for sending the packet from the first node to the second node. In some examples, the SRv6 uSID calculator component associated with the underlay network controller may determine the path through the underlay. For instance, the SRv6 uSID calculator may field the service request from the overlay network controller and query a database associated with the underlay network, or an SRv6 topology/performance cache, for paths through the underlay that satisfy the service request in view of the parameter(s). That is, the SRv6 uSID calculator, or the underlay network controller itself, may determine a path through the underlay that is optimized to satisfy the request in terms of policy, performance, routing, services provided by underlay nodes, and/or the like. In the case that the database is queried, the database may respond with path information, including SRv6 locator segment identifiers (SIDs) for each of the underlay nodes in a given path. In some examples, the path through the underlay network may be determined based at least in part on a network topology graph and/or performance data associated with the underlay network.

In examples, the method may also include determining a destination address for sending the packet along the path to the second node, the destination address including a first portion that precedes a second portion, the first portion including one or more micro segment identifiers (uSIDs) corresponding with one or more respective underlay nodes disposed along the path through the underlay network, the second portion including multiple bits representing a portion of an address that corresponds with the second node. For example, the SRv6 uSID calculator component and/or the underlay controller may generate or otherwise determine a 128-bit IPv6 destination address, which is embedded with (i) one or more SRv6 uSIDs corresponding with the underlay node(s) (e.g., the first portion) and (ii) trailing bits (e.g., the second portion), which when the micro-segment shift-and-forward operations are completed by the underlay nodes, the resulting 128-bit IPv6 address will be the same address as that of the WAN tunnel endpoint node's address. That is, the SRv6 uSID calculator, and/or the controller of the service provider underlay network, may have functionality to be able to combine SRv6 uSID steering bits and WAN tunnel endpoint trailing bits into a common IPv6 destination address such that the WAN dataplane node (e.g., the overlay tunnel headend node) can impose or otherwise encapsulate a single, outer IPv6 header and thus prevent the need for packet recirculation.

In some instances, the method also include sending the destination address to the controller of the overlay network, the destination address to be used to send the packet from the first node to the second node along the path through the underlay network. For instance, the underlay controller (e.g., GSIP) and/or the SRv6 uSID calculator component may send the destination address to the overlay controller. In some examples, overlay network controller or control plane may then program the data plane node (e.g., overlay tunnel headend) with forwarding entries such that any traffic class or flow that requires the service provider underlay network service is encapsulated in this new IPv6 header whose destination address contains embedded SRv6 micro-segment instructions to cause the packet to be sent along a specific underlay path, and whose final 128-bits—after shift-and-forward operations in the underlay— will match the egress WAN overlay tunnel endpoint address. That is, an underlay node of the underlay network, upon receiving the packet, may shift the first portion and second portion of the destination address such that the entire destination address represents an entire portion of the address that corresponds with the second node.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
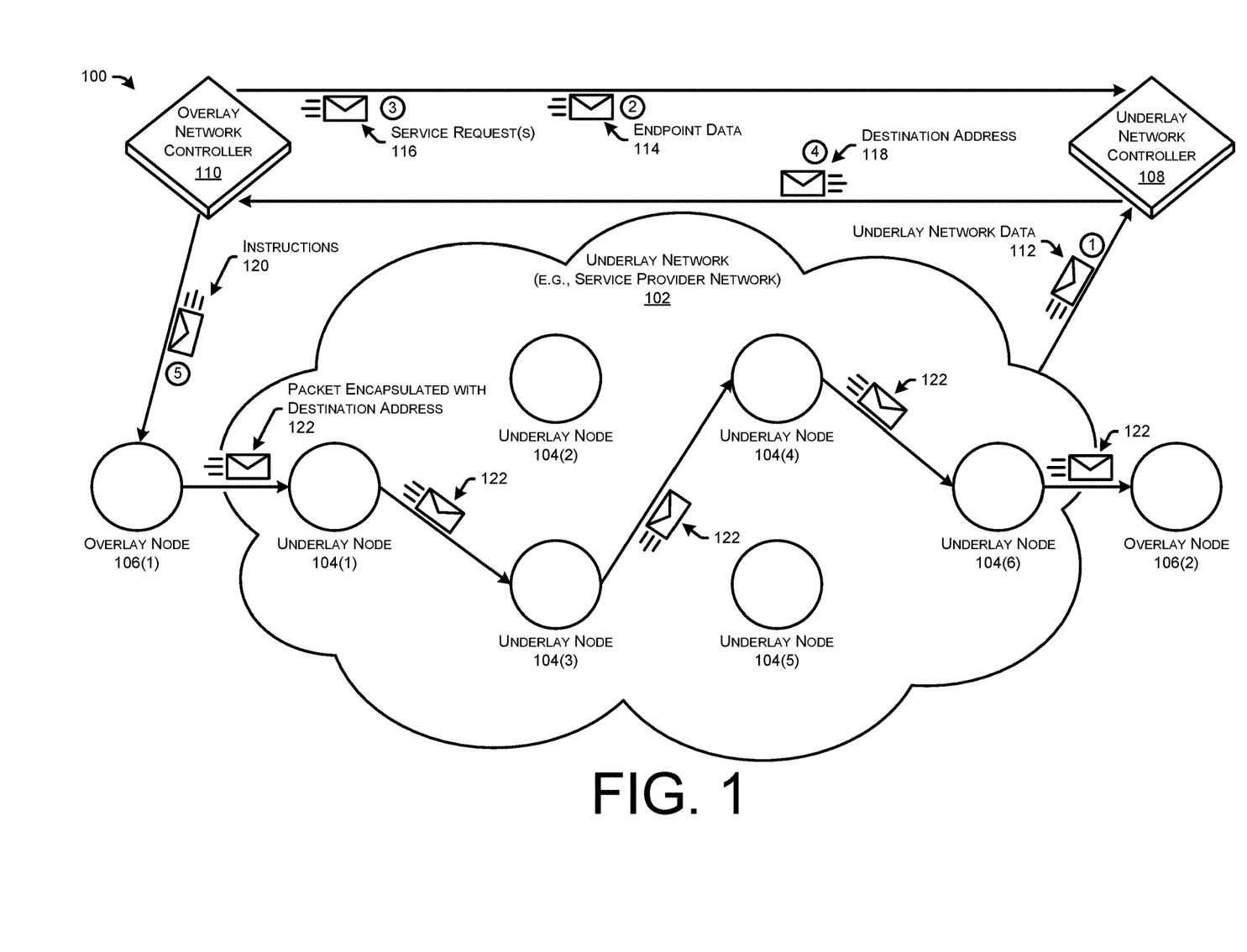
FIG. 1 illustrates an example architecture that may implement various aspects of the technologies described herein for steering overlay network traffic through specific paths of an underlay network.

FIG. 1 illustrates an example architecture 100 associated with an overlay network that may implement various aspects of the technologies described herein for steering overlay network traffic through specific paths of an underlay network 102. The underlay network 102 may include multiple underlay nodes 104(1)-104(6) (hereinafter referred to collectively as "underlay nodes 104"). Although depicted as having six underlay nodes 104, it is to be appreciated that the underlay network 102 may include any number of underlay nodes 104, including more or fewer, than the six underlay nodes 104 shown in FIG. 1.

The architecture 100 also includes overlay nodes 106(1) and 106(2) (hereinafter referred to collectively as "overlay nodes 106") that are associated with an overlay network, as well as an underlay network controller 108 and an overlay network controller 110. In the architecture 100 shown in FIG. 1, the overlay nodes 106 may represent tunnel endpoints of an overlay tunnel that traverses the underlay network 102.

In some examples, such as at "1," the underlay network controller 108 (e.g., GSIP) may receive underlay network data 112 associated with the underlay network 102. The underlay network controller 108 may, in some instances, determine and maintain real-time and/or historical underlay network topology and performance data based on the underlay network data 112. In some instances, this may include mapping overlay tunnel endpoint (e.g., overlay nodes 106) prefix data to an overall topology graph. In some examples, the overlay network controller 110 may subscribe to underlay network 102 services, and the overlay network controller 110 may register/authenticate with the underlay network controller 108 and provide the underlay network controller 108 with a list of overlay tunnel endpoints.

At "2," in some examples, an SRv6 uSID calculator component, which may be associated with or run by the underlay network controller 108, may receive endpoint data 114 associated with the overlay network tunnel endpoints and populate it in a database that is accessible to the underlay network controller 108 such that the overlay nodes 106 (e.g., tunnel endpoint nodes) become part of the overall topology/performance graph. In additional or alternative examples, the overlay node 106(1) (e.g., overlay tunnel headend node) and the underlay node 104(1) (e.g., underlay headend node) may be collocated, and exchanging the endpoint data 114 may not be necessary as the two nodes may be the same node, and each network controller may be aware of their information.

In some examples, as shown in "3," for certain traffic classes or flows that require certain service on the underlay network 102, when the overlay network programs the overlay nodes 106 to steer their traffic through an overlay tunnel, the overlay network controller 110 may send service request(s) 116 via an application programming interface exposed by the underlay network controller 108. In such examples, the SRv6 uSID calculator may field the service request(s) 116 and query the database, or an SRv6 topology/performance cache, for paths through the underlay network 102 that satisfy the service request(s) 116. That is, the SRv6 uSID calculator, or the underlay network controller 108 itself, may determine a path through the underlay network 102 that is optimized to satisfy the request in terms of policy, performance, routing, and/or the like. In the case that the database is queried, the database may respond with path information, including SRv6 locator segment identifiers (SIDs) for each of the underlay nodes 104 in a given path. For instance, in the path shown in FIG. 1, the SIDs may be returned for the underlay nodes 104(1), 104(3), 104(4), and 104(6).

In this way, the SRv6 uSID calculator or the underlay network controller 108 may construct or otherwise determine a 128-bit IPv6 destination address 118, which is embedded with (i) one or more SRv6 uSIDs corresponding with the underlay nodes 104(1), 104(3), 104(4), and 104(6) and (ii) trailing bits, which when the micro-segment shift-and-forward operations are completed by the underlay nodes 104, the resulting 128-bit IPv6 address will be the same address as that of the overlay node 106(2). That is, the SRv6 uSID calculator, and/or the underlay network controller 108, may have functionality to be able to combine SRv6 uSID steering bits and overlay tunnel endpoint trailing bits into a common IPv6 destination address such that the overlay data nodes 106 (e.g., the overlay tunnel headend node) can impose or otherwise encapsulate a single, outer IPv6 header and thus prevent the need for packet recirculation.

At "4," the SRv6 uSID calculator and/or the underlay network controller 108 may pass the destination address 118 to the overlay network controller 110 in response to the underlay network service request 116. At "5," the overlay network controller 110 may then send instructions 120 to the overlay node 106(1) to program it with forwarding entries such that any traffic class or flow that requires the underlay network 102 service is encapsulated in this new IPv6 header whose destination address contains embedded SRv6 micro-segment instructions to cause the packet to be sent along a specific underlay path, and whose final 128-bits—after shift-and-forward operations in the underlay—will match the address of the egress overlay node 106(2).

In this way, upon receipt of traffic matching the underlay services ruleset, the overlay node 106(1) may encapsulates the packets and send the packet encapsulated with destination address 122 outbound to the underlay network 102. In examples, the underlay nodes 104 shift-and-forward the packet encapsulated with destination address 122 per the micro-segment instructions found in the outer IPv6 destination address. Additionally, after the final shift-and-forward, the packet encapsulated with destination address 122 arrives at the egress overlay node 106(2), the outer IPv6 destination address matches its own tunnel endpoint address, and the overlay node 106(2) decapsulates the outer header and forwards the original packet towards its destination.

Figure 2:
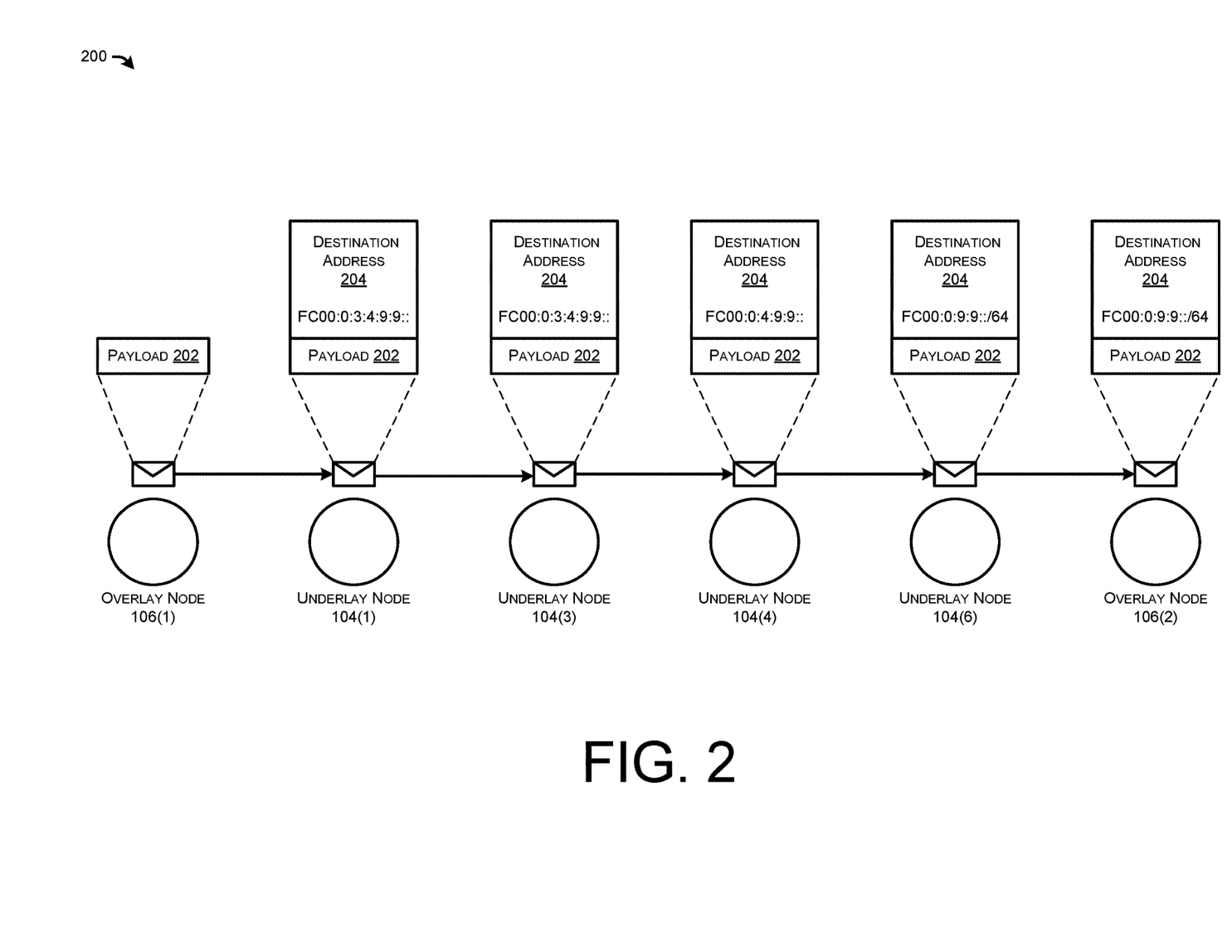
FIG. 2 illustrates an example in which nodes of an underlay network shift a destination address of a packet to steer the packet through the underlay fabric.

FIG. 2 illustrates an example 200 in which nodes of an underlay network shift a destination address of a packet to steer the packet through the underlay fabric. For instance, when the overlay node 106(1) receives the packet, the packet includes a payload 202. Because the overlay node 106(1) has been programmed by the overlay network controller to steer the packet through a specific path of the underlay, the overlay node 106(1) encapsulates the packet with a destination address 204 which is embedded with (i) one or more SRv6 uSIDs corresponding with the underlay node 104(3) and 104(4) and (ii) trailing bits, which when the micro-segment shift-and-forward operations are completed by the underlay nodes 104, the resulting 128-bit IPv6 address will be the same address as that of the overlay node 106(2).

As an example of the 128-bit IPv6 address determination, upon receiving an underlay network service request, the SRv6 uSID calculator may perform database queries for one or multiple path(s) that will satisfy the service request. An example response could include the following four 128-bit SRv6 segment identifiers, in addition to other path attribute data:

FC00:0000:0001:0000:0000:0000:0000, corresponding with underlay node 104(1) of FIG. 2.
FC00:0000:0003:0000:0000:0000:0000, corresponding with underlay node 104(3) of FIG. 2.
FC00:0000:0004:0000:0000:0000:0000, corresponding with underlay node 104(4) of FIG. 2.

FC00:0000:0006:0000:0000:0000:0000, corresponding with underlay node 104(6) of FIG. 2.

However, it would be inefficient and burdensome to have the overlay node 106(1) impose a full SRv6 SRH with so many 128-bit SIDs on outbound packets. Instead, the SRv6 uSID calculator may derive a single 128-bit IPv6 destination address by plucking out the necessary micro-segment (uSID) bits from each 128-bit segment identifier. As such, and continuing the above example, the SRv6 uSID calculator may analyze the provided SRv6 SID list as follows:

FC00:0000 is the SRv6 uSID block.

FC00:0000:0001, corresponding with underlay node 104(1), is the upstream service provider underlay router, which the overlay node 106(1) is aware of, therefore this micro-segment is not needed.

FC00:0000:0003, corresponding with underlay node 104(3), is the first underlay steering hop. The "0003" will be shifted out at underlay node 3.

FC00:0000:0004, corresponding with underlay node 104(4), is the second underlay steering hop. The "0004" will be shifted out at underlay node 4.

FC00:0000:0006, corresponding with underlay node 104(6), is the egress service provider underlay router; this micro-segment is not needed due to PHP behavior Then the SRv6 uSID calculator may determine what the final IPv6 destination address needs to be by matching the tunnel endpoint address previously populated in the graph. For instance, continuing the above example, the overlay tunnel endpoint address corresponding with the overlay node 106(2) may be as follows:

FC00:0000:0009:0009::/64

The SRv6 uSID calculator may then derive the 128-bit IPv6 destination address with SRv6 micro-segment instructions inserted between the SRv6 uSID block and the overlay tunnel endpoint trailing bits, such as follows:

FC00:0000:0003:0004:0009:0009:0000:0000/64

In order to fit this destination address into the destination address 204 block of FIG. 2, the destination address 204 is shown with the IPv6 addresses in their compressed format. For instance, FC00:0000:0003:0004:0009:0009:0000:0000/64 is shown as FC00:0:3:4:9:9:. As shown, the underlay nodes 104 shift and forward the destination address 204 encapsulated in the packet. For instance, the underlay node 104(3) shifts out the "3" in the destination address 204 and forwards the packet with the shifted address along to underlay node 104(4). Underlay node 104(4) then shifts the "4" out of the destination address and forwards the packet with the shifted address along to underlay node 104(6). When underlay node 104(6) receives the packet, the destination address 204 corresponds with the address of the overlay node 106(2).

Figure 3:
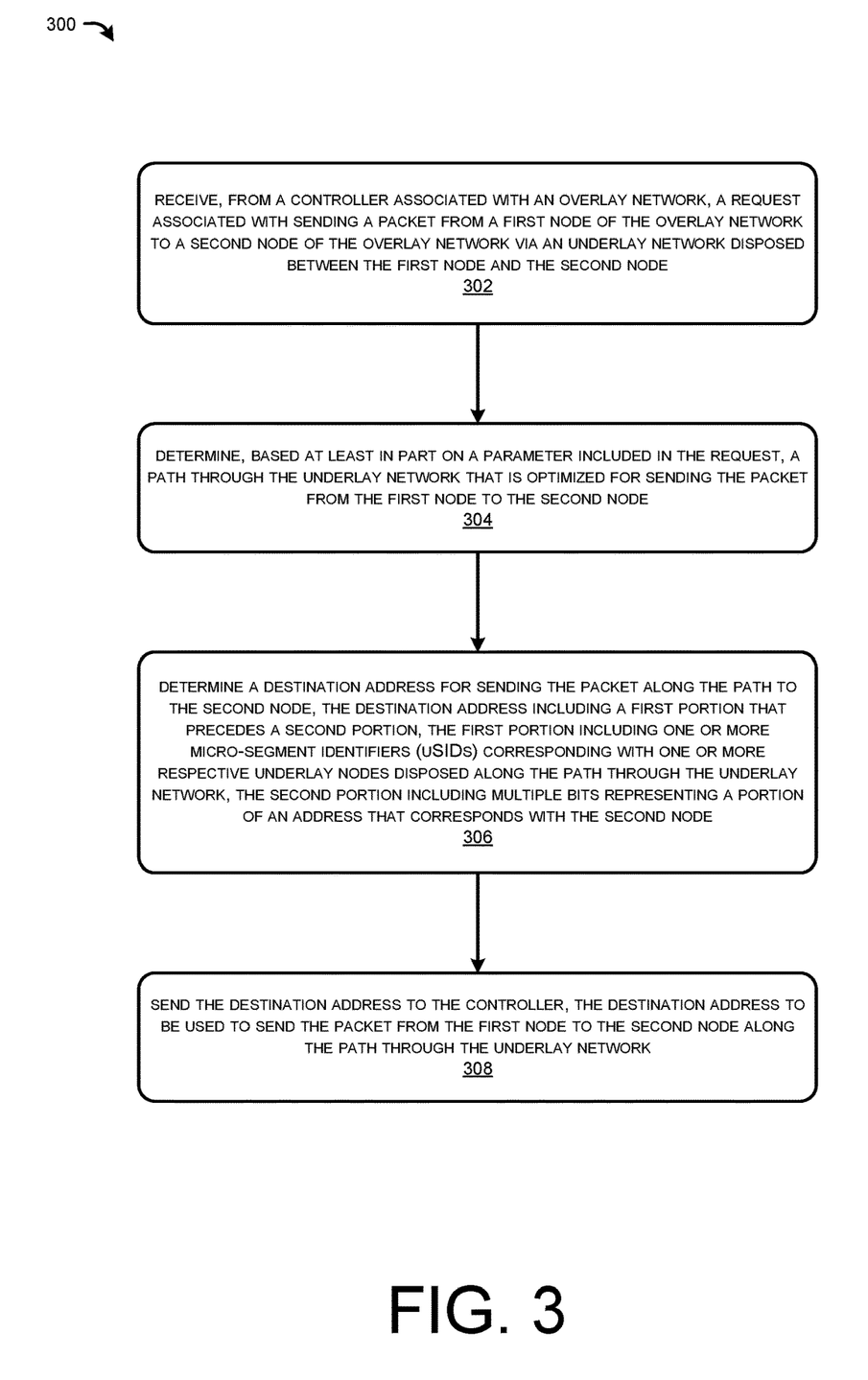
FIG. 3 is a flow diagram illustrating an example method associated with the techniques described herein for steering overlay network traffic through specific paths of an underlay network.

FIG. 3 is a flow diagram illustrating an example method 300 associated with the techniques described herein for steering overlay network traffic through specific paths of an underlay network. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes receiving, from a controller associated with an overlay network, a request associated with sending a packet from a first node of the overlay network to a second node of the overlay network via an underlay network disposed between the first node and the second node. For instance, the underlay network controller 108 and/or the SRv6 uSID calculator component associated with the underlay network controller 108 may receive, from the overlay network controller 110, a service request 116 associated with sending a packet from a first node of the overlay network (e.g., overlay node 106(1)) to a second node of the overlay network (e.g., overlay node 106(2)) via the underlay network 102 disposed between the first node and the second node.

At operation 304, the method 300 includes determining, based at least in part on a parameter included in the request, a path through the underlay network that is optimized for sending the packet from the first node to the second node. For instance, the underlay network controller 108 and/or the SRv6 uSID calculator component associated with the underlay network controller 108 may determine, the path (e.g., nodes 104(1), 104(3), 104(4) and 104(6)) through the underlay network 102 that is optimized for sending the packet from the first node to the second node.

At operation 306, the method 300 includes determining a destination address for sending the packet along the path to the second node, the destination address including a first portion that precedes a second portion, the first portion including one or more micro segment identifiers (uSIDs) corresponding with one or more respective underlay nodes disposed along the path through the underlay network, the second portion including multiple bits representing a portion of an address that corresponds with the second node. For instance, the underlay network controller 108 and/or the SRv6 uSID calculator component associated with the underlay network controller 108 may determine the destination address 204 for sending the packet along the path to the second node, the destination address including a first portion that precedes a second portion, the first portion including one or more micro segment identifiers (uSIDs) corresponding with one or more respective underlay nodes 104 disposed along the path through the underlay network, the second portion including multiple bits representing the portion of the address that corresponds with the second node (e.g., the overlay node 106(2)).

At operation 308, the method 300 includes sending the destination address to the controller, the destination address to be used to send the packet from the first node to the second node along the path through the underlay network. For instance, the underlay network controller 108 and/or the SRv6 uSID calculator component associated with the underlay network controller 108 may send the destination address 204 to the overlay network controller 110, the destination address to be used to send the packet from the first node to the second node along the path through the underlay network 102. That is, the overlay network controller 110 may program the overlay node 106(1) to use the address to send the packet along the path through the underlay network 102.

Figure 4:
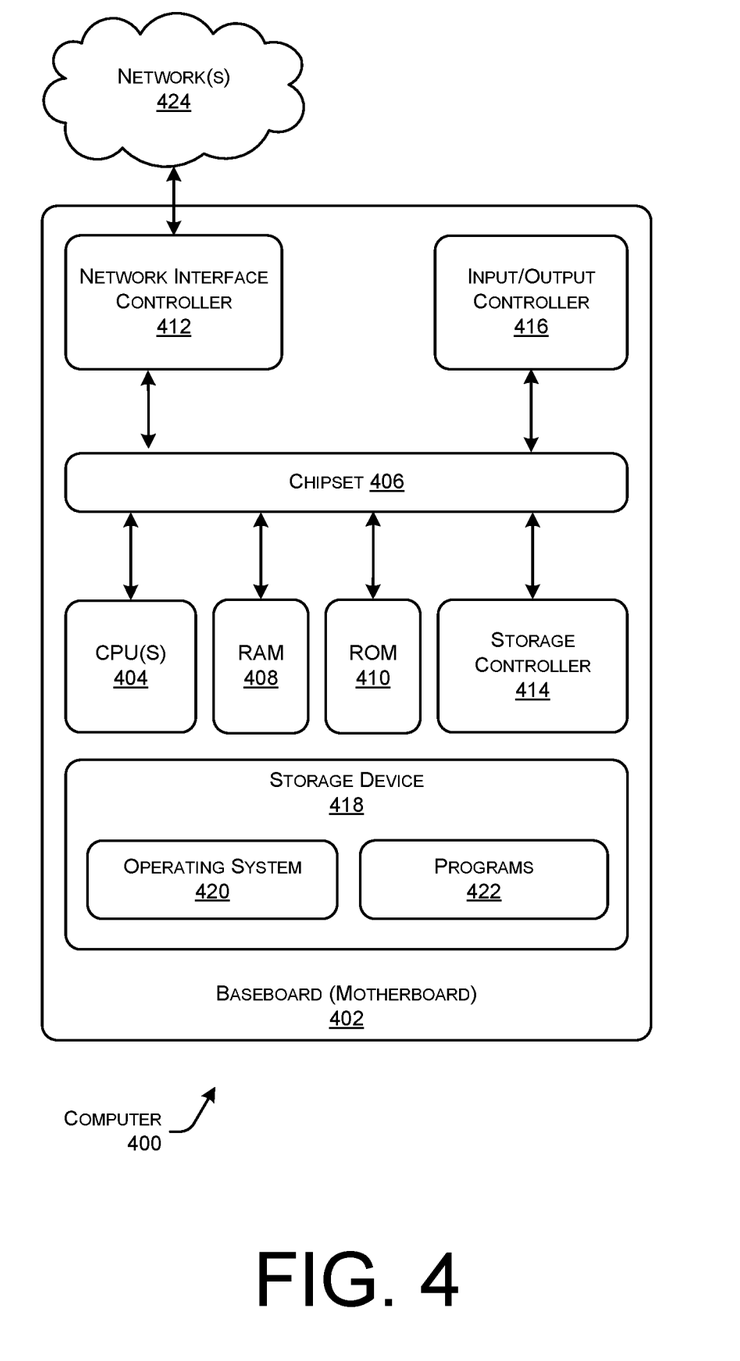
FIG. 4 is a computer architecture diagram showing an illustrative computer hardware architecture for implementing a computing device that can be utilized to implement aspects of the various technologies presented herein.

FIG. 4 is a computer architecture diagram showing an illustrative computer hardware architecture for implementing a computing device that can be utilized to implement aspects of the various technologies presented herein. The computer architecture shown in FIG. 4 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network. The chipset 406 can include functionality for providing network connectivity through a NIC 412, such as a gigabit Ethernet adapter. The NIC 412 is capable of connecting the computer 400 to other computing devices over the network 424. It should be appreciated that multiple NICs 412 can be present in the computer 400, connecting the computer to other types of networks and remote computer systems. In some examples, the NIC 412 may be configured to perform at least some of the techniques described herein.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by the architecture 100 and or any components included therein, may be supported by one or more devices similar to computer 400. Stated otherwise, some or all of the operations performed by the architecture 100, and or any components included therein, may be performed by one or more computer devices 400 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants.

It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes and functionality described above with regard to FIGS. 1-3, and herein. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

The computer 400 may include one or more hardware processors (processors) configured to execute one or more stored instructions. The processor(s) may comprise one or more cores. Further, the computer 400 may include one or more network interfaces configured to provide communications between the computer 400 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 422 may comprise any type of programs or processes to perform the techniques described in this disclosure for enabling overlay-based network systems (e.g., software-defined wide area network (SD-WAN) systems, etc.) with the ability to steer their overlay traffic through specific path(s) of a service provider underlay network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, by an underlay network controller, a request from an overlay network controller, the request is associated with sending a packet from a first node of an overlay network to a second node of the overlay network via an underlay network disposed between the first node and the second node;
   determining, by the underlay network controller and based at least in part on a parameter included in the request, a path through the underlay network that is optimized for sending the packet from the first node to the second node;
   determining, by the underlay network controller, a destination address for sending the packet along the path from the first node to the second node, the destination address including:
      micro segment identifiers (uSIDs) corresponding to segments of the path in the underlay network that are configured to steer the packet through the underlay network and along the path, and
      trailing bits representing a portion of an address that corresponds with the second node; and
   sending, by the underlay network controller the destination address to the overlay network controller, the destination address to be used to send the packet from the first node to the second node along the path through the underlay network.

2. The method of claim 1, wherein the parameter included in the request is at least one of a policy parameter or a performance parameter associated with sending the packet from the first node to the second node.

3. The method of claim 1, wherein the overlay network is a software-defined wide area network and the underlay network is at least one of a service provider network or a transport network.

4. The method of claim 1, wherein the path through the underlay network is determined based at least in part on at least one of a network topology or performance data associated with the underlay network.

5. The method of claim 1, further comprising determining a topology graph associated with the underlay network, the topology graph indicative of a topology of the underlay network and connections between one or more data plane nodes of the overlay network and one or more edge nodes of the underlay network.

6. The method of claim 1, wherein the destination address is a 128-bit internet protocol version six (IPv6) destination address and the uSIDs are associated with a segment routing over IPv6 (SRv6) protocol.

7. The method of claim 1, wherein multiple underlay nodes are disposed along the path through the underlay network, and wherein the destination address includes a respective uSID for each one of the multiple underlay nodes disposed along the path.

8. The method of claim 1, wherein the segments represent a plurality of underlay network nodes.

9. A system comprising:
   one or more processors; and
   one or more non-transitory computer-readable media storing instructions that, when executed, cause the one or more processors to perform operations comprising:
   receiving, by an underlay network controller, a request from an overlay network controller, the request is associated with sending a packet from a first node of the overlay network to a second node of the overlay network via an underlay network disposed between the first node and the second node;

determining, by the underlay network controller and based at least in part on a parameter included in the request, a path through the underlay network that is optimized for sending the packet from the first node to the second node;

determining, by the underlay network controller, a destination address for sending the packet along the path to the second node, the destination address including a first portion that precedes a second portion, the first portion including micro segment identifiers (uSIDs) a corresponding to segments of the path in the underlay network that is configured to steer the packet through the underlay network and along the path, the second portion including multiple bits representing a portion of an address that corresponds with the second node; and sending, by the underlay network controller, the destination address to the overlay network controller, the destination address to be used to send the packet from the first node to the second node along the path through the underlay network.

10. The system of claim 9, wherein the parameter included in the request is at least one of a policy parameter or a performance parameter associated with sending the packet from the first node to the second node.

11. The system of claim 9, wherein the overlay network is a software-defined wide area network and the underlay network is at least one of a service provider network or a transport network.

12. The system of claim 9, wherein the path through the underlay network is determined further based at least in part on at least one of a network topology or performance data associated with the underlay network.

13. The system of claim 9, the operations further comprising determining a topology graph associated with the underlay network, the topology graph indicative of a topology of the underlay network and connections between one or more data plane nodes of the overlay network and one or more edge nodes of the underlay network.

14. The system of claim 9, wherein an underlay node of the underlay network, upon receiving the packet, shifts the first portion and second portion of the destination address such that the destination address represents an entire portion of the address that corresponds with the second node.

15. The system of claim 9, wherein the segments represent a plurality of underlay network nodes.

16. One or more non-transitory computer-readable media storing instructions that, when executed, cause one or more processors to perform operations comprising:

receiving, by an underlay network controller, a request from an overlay network controller, the request is associated with sending a packet from a first node of the overlay network to a second node of the overlay network via an underlay network disposed between the first node and the second node;

determining, by the underlay network controller and based at least in part on a parameter included in the request, a path through the underlay network that is optimized for sending the packet from the first node to the second node;

determining, by the underlay network controller, a destination address for sending the packet along the path to the second node, the destination address including a first portion that precedes a second portion, the first portion including micro segment identifiers (uSIDs) corresponding to segments of the path in the underlay network that is configured to steer the packet along the path, the second portion including multiple bits representing a portion of an address that corresponds with the second node; and sending, by the underlay network controller, the destination address to the overlay network controller, the destination address to be used to send the packet from the first node to the second node along the path through the underlay network.

17. The one or more non-transitory computer-readable media of claim 16, wherein the parameter included in the request is at least one of a policy parameter or a performance parameter associated with sending the packet from the first node to the second node.

18. The one or more non-transitory computer-readable media of claim 16, wherein the overlay network is a software-defined wide area network and the underlay network is at least one of a service provider network or a transport network.

19. The one or more non-transitory computer-readable media of claim 16, wherein the path through the underlay network is determined further based at least in part on at least one of a network topology or performance data associated with the underlay network.

20. The one or more non-transitory computer-readable media of claim 16, the operations further comprising determining a topology graph associated with the underlay network, the topology graph indicative of a topology of the underlay network and connections between one or more data plane nodes of the overlay network and one or more edge nodes of the underlay network.

* * * * *